United States Patent
Schumacher et al.

(10) Patent No.: US 7,537,266 B2
(45) Date of Patent: May 26, 2009

(54) VEHICLE ROOF ADJUSTABLE BETWEEN CLOSED AND STORAGE POSITIONS

(75) Inventors: Thorsten Schumacher, Kummerfeld (DE); Stephan Rau, Karlruhe (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 205 days.

(21) Appl. No.: 11/560,138

(22) Filed: Nov. 15, 2006

(65) Prior Publication Data

US 2007/0108793 A1    May 17, 2007

(30) Foreign Application Priority Data

Nov. 15, 2005    (DE)    ................ 10 2005 054 857

(51) Int. Cl.
*B60J 7/20*    (2006.01)
(52) U.S. Cl. .............. 296/107.08; 296/76; 296/108
(58) Field of Classification Search ........... 296/107.01, 296/107.08, 76, 108
See application file for complete search history.

(56) References Cited

U.S. PATENT DOCUMENTS

| | | | |
|---|---|---|---|
| 5,823,606 A * | 10/1998 | Schenk et al. | 296/107.08 |
| 6,193,300 B1 * | 2/2001 | Nakatomi et al. | 296/107.08 |
| 6,270,144 B1 * | 8/2001 | Schenk | 296/107.08 |
| 6,352,298 B1 * | 3/2002 | Hayashi et al. | 296/107.08 |
| 6,557,923 B2 * | 5/2003 | Halbweiss et al. | 296/136.06 |
| 6,578,899 B2 * | 6/2003 | Hasselgruber et al. | 296/107.08 |
| 6,595,572 B2 | 7/2003 | Schuler et al. | |
| 6,604,775 B2 | 8/2003 | Obendiek | |
| 6,619,720 B2 * | 9/2003 | Nicastri | 296/107.08 |

(Continued)

FOREIGN PATENT DOCUMENTS

DE    197 06 444 C1    6/1998

(Continued)

*Primary Examiner*—Glenn Dayoan
*Assistant Examiner*—Paul A Chenevert
(74) *Attorney, Agent, or Firm*—Brooks Kushman P.C.

(57) ABSTRACT

A vehicle roof assembly includes a roof having roof parts adjustable between a closed position in which the parts cover the vehicle interior and a storage position in which the parts are stowed in the vehicle trunk. A rear cover frame is adjustably attached to the vehicle body to move between a maximum raised position and a lowered storage position. A kinematic system connected between a rear cover and the frame is movable between an extended position in which the cover is in an opened position raised above the trunk and the frame is in a raised position, and a retracted position in which the cover is in a closed position covering the trunk and the frame is in its lowered position. A stop device associated with the frame limits the raising motion of the frame in an intermediate raised position between its lowered and maximum raised positions.

13 Claims, 8 Drawing Sheets

U.S. PATENT DOCUMENTS

| | | |
|---|---|---|
| 6,824,194 B2 | 11/2004 | Weissmueller |
| 6,923,491 B2 | 8/2005 | Hahn |
| 6,983,976 B2 | 1/2006 | Reinsch |
| 7,150,481 B2 | 12/2006 | Knieper |
| 7,201,428 B2 * | 4/2007 | Wagner ................. 296/107.08 |
| 2001/0042991 A1 * | 11/2001 | Schuler et al. ......... 296/107.08 |
| 2002/0093218 A1 | 7/2002 | Weissmueller |
| 2003/0025350 A1 * | 2/2003 | Sande ................... 296/107.08 |
| 2003/0080581 A1 * | 5/2003 | Quindt ....................... 296/136 |
| 2003/0197395 A1 | 10/2003 | Reinsch |
| 2004/0155480 A1 | 8/2004 | Willard |
| 2004/0178656 A1 | 9/2004 | Hahn |
| 2005/0035617 A1 | 2/2005 | Knieper |
| 2006/0186694 A1 | 8/2006 | Wagner |

FOREIGN PATENT DOCUMENTS

| | | |
|---|---|---|
| DE | 102 13 548 A1 | 10/2003 |
| DE | 102 16 417 A1 | 10/2003 |
| DE | 103 40 017 B3 | 8/2004 |
| DE | 103 31 392 B3 | 3/2005 |
| DE | 103 37 473 A1 | 3/2005 |
| DE | 103 53 515 B3 | 4/2005 |
| EP | 1 199 202 A2 | 4/2002 |
| WO | WO 03/086801 A1 | 10/2003 |

* cited by examiner

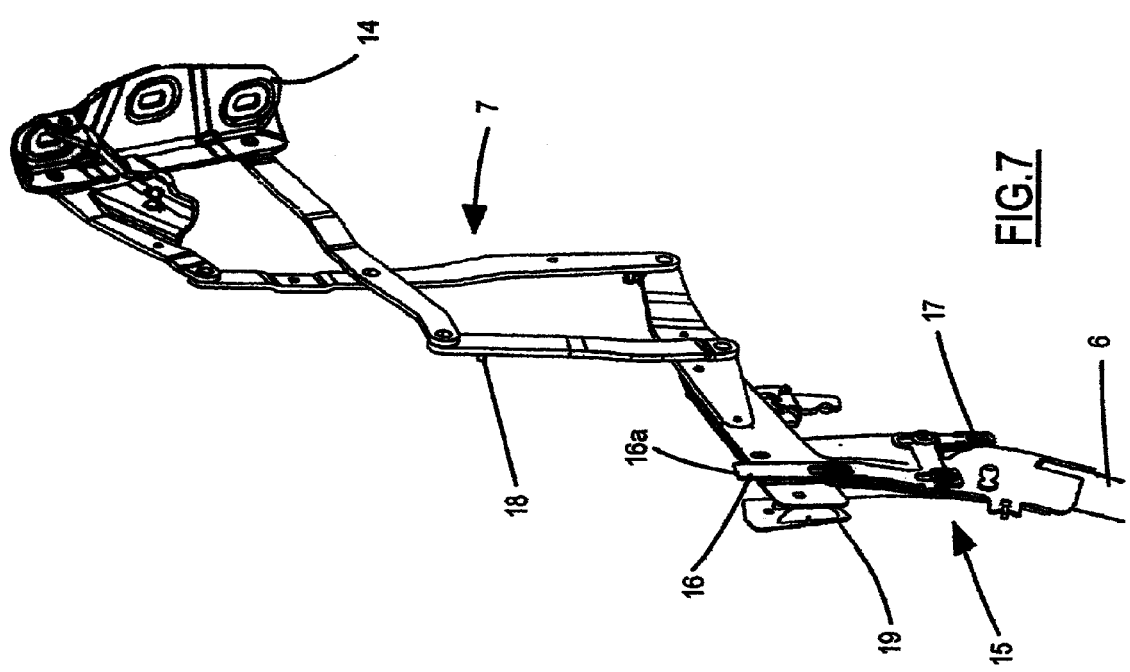

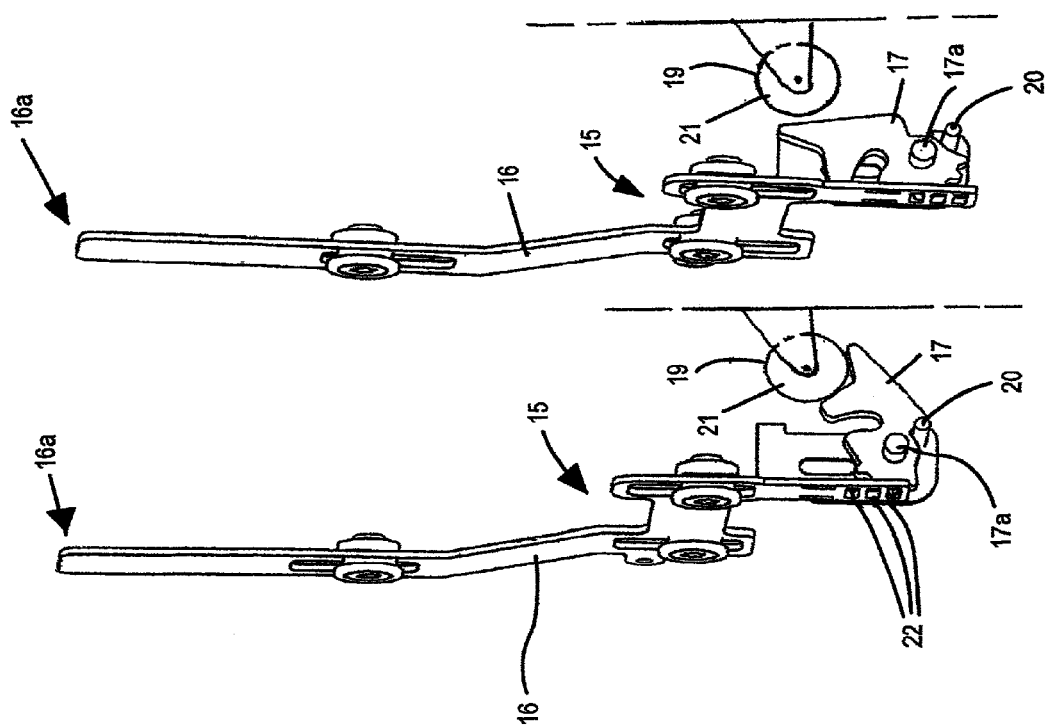

VEHICLE ROOF ADJUSTABLE BETWEEN CLOSED AND STORAGE POSITIONS

CROSS-REFERENCE TO RELATED APPLICATIONS

This application claims foreign priority benefits under 35 U.S.C. § 119(a)-(d) to DE 10 2005 054 857.1, filed Nov. 15, 2005, which is hereby incorporated by reference in its entirety.

BACKGROUND OF THE INVENTION

1. Field of the Invention

The present invention relates to a vehicle roof movable between closed and storage positions.

2. Background Art

DE 102 16 417 A1 describes a convertible vehicle having a foldable roof. The roof includes roof parts movable between a closed position in which the roof covers the vehicle interior and a storage position in which the roof parts are lowered and stowed in a storage compartment of the vehicle trunk. A rear cover is movable to cover the storage compartment. A kinematic system adjustably couples the rear cover to a tubular frame articulately connected to the vehicle body. The tubular frame and the rear cover can be swung up about the body-side axis of rotation of the tubular frame, and when the kinematic system is actuated, the rear cover executes a motion relative to the tubular frame. Different movements are executed for roof storage and trunk opening. When the roof is stored, the tubular frame remains in the storage compartment and the kinematic system is actuated to raise the front edge of the rear cover allowing the roof to transferrable move and pass into the storage compartment. To load the trunk, the tubular frame and the rear cover are swung up about the body-side axis of rotation so that the rear edge of the rear cover is raised and the trunk is accessible.

To make it easier to load the trunk, the roof stowed in the storage compartment can be put into a raised loading assistance position. To accomplish this, the roof kinematic system for raising the roof parts is actuated, when the rear cover is open and the tubular frame raised, into a position directly beneath the swung-up rear cover. This makes the space located beneath the roof parts more accessible.

The swung-up tubular frame including the rear cover held on the tubular frame represent a relatively large mass which can be set into oscillation relatively easily. To prevent excessively high stress on the mounts of the tubular frame, it is necessary to ensure the oscillations do not exceed a permissible value. Moreover, it is necessary to ensure the proportions of the tubular frame and the contours of the roof adapt to one another.

DE 102 16 417 A1 describes the tubular frame remaining in the storage compartment while the roof executes the storage movement and the roof is laid down through the opening bordered and delimited by the tubular frame. This requires a tubular frame of relatively large dimensions.

SUMMARY OF THE INVENTION

An object of the present invention is a vehicle having a foldable roof characterized by increased safety from undesired oscillations when the rear cover is open and in which it is expedient for the trunk to easily and safely be loaded.

In carrying out the above object and other objects, the present invention provides a roof assembly for a vehicle. The roof assembly includes a roof having roof parts adjustable between a closed position in which the roof parts cover an interior of a vehicle and a storage position in which the roof parts stack on top of one another and the roof part stack is lowered and stowed in a trunk of the vehicle. A rear cover frame is adjustably attached to the body of the vehicle to move between a maximum raised position and a lowered storage position. A kinematic system is connected between a rear cover and the rear cover frame. The kinematic system is movable between an extended position in which the rear cover is in an opened position raised above the trunk and the rear cover frame is in a raised position, and a retracted position in which the rear cover is in a closed position covering the trunk and the rear cover frame is in its lowered storage position. A stop device is associated with the rear cover frame. The stop device limits the raising motion of the rear cover frame in an intermediate raised position between its lowered storage position and its maximum raised position.

In accordance with an embodiment of the present invention, a stop device limits the raising motion of the rear cover frame in a raised intermediate position lying between the lowered stored position of the cover frame and the maximum possible raised position of the cover frame. The stop device prevents the cover frame from being raised farther than the raised intermediate position. This has the consequence that the cover frame is pressed against the stop device by the force of the raising actuator, providing additional support to the cover frame including the rear cover. The support point lies at a distance from the kinematic system of the cover frame through which the cover frame is connected with the vehicle body so that the cover frame is supported with respect to the vehicle body at a minimum of two points that are separated, when viewed in the vehicle's longitudinal direction. This provides a substantial improvement especially regarding safety from undesired oscillations of the frame and the cover.

Another advantage of stopping the cover frame in a raised intermediate position for loading the trunk is that, especially in the case when the pivot axis of the cover frame lies next to the rear edge of the vehicle, the entire package of the frame and the cover makes only limited motion in the direction toward a person standing at the back of the vehicle. This improves the person's subjective feeling during the raising motion in his or her direction.

Moreover, along with the raising of the cover frame, the roof stored beneath the frame is adjustable into a raised loading assistance position. This loading assistance position makes it easier to load the trunk, especially the free space located beneath the roof. The loading assistance function can be realized with large roofs having a dimension when viewed from the top greater than the insert delimited by the cover frame. Raising the cover frame creates space for raising a rear parcel shelf or hinged flaps, for example, arranged on the roof kinematic system, the vehicle body, or on the cover frame. The rear parcel shelf or hinged flaps move into a position covering the passage of the kinematic system when the roof is in its stored position. Raising the rear parcel shelf or the hinged flaps makes it possible to put up the stored roof into loading assistance position.

The inventive design can be realized in an especially advantageous manner on a vehicle whose cover frame can be swung up about an axis of rotation next to the rear edge of the vehicle. This swinging up motion is executed by the cover frame both for the storage or closing movement of the roof and for the loading assistance position when the trunk is being loaded. For the storage and closing movement of the roof, the cover frame is swung up into a maximally raised position, to allow a sufficiently large passage for the roof. For loading the trunk and for the slight raising of the roof into the loading assistance position it is sufficient to swing the cover frame up into the intermediate position in which the cover frame is stopped. In both cases, the cover frame executes the same basic swinging up movement.

While for the storage and closing movement of the roof the cover remains in a position lying directly on the cover frame and is moved together with the cover frame into the maximally raised position, for loading the trunk the kinematic system is actuated to open the cover with respect to the cover frame.

An embodiment of the present invention provides that this opening movement represents both the closing movement of the cover with respect to the cover frame and, at the same time, the actuation movement for conveying the stop device for the cover frame between its operating position and its non-operating position. In this embodiment, the stop device is mechanically actuated as the stop device is conveyed between its operating position and its non-operating position by mechanical means. However, electrical, hydraulic, or pneumatic means are also possible for conveying the stop device out of its operating position into its non-operating position. For example, it is possible to use a sensor which detects when the cover frame reaches the intermediate position and delivers a signal which is fed to the actuation device for controlling the actuating drive of the cover frame.

In an embodiment of the present invention, the stop device includes a locking stop. The locking stop can be moved between the non-operating position and the operating position, in which the raising movement of the cover frame is limited. Thus, the operating position is associated with loading the trunk, and the non-operating position is associated with conveying the roof between its closing and storage positions. To convey this locking stop into the operating position, it is expedient to make use of the relative motion between the cover and the cover frame. This can be done, for example, by having a spring apply tension, directly or indirectly, to hold the locking stop in operating position, and the cover, or a component associated with the cover, moving it against the force of the spring into the non-operating position when the cover is closed. Raising the cover relative to the cover frame releases the locking stop, and the force of the spring acting on it moves it into the operating position. As soon as the cover is closed again, that is, as soon as it assumes its position resting on the cover frame, the cover or the component connected with it presses the locking stop against the force of the spring back into its non-operating position. This ensures that the locking stop remains in the non-operating position when the roof moves between its closed and storage positions, and that the raising movement of the cover frame all the way to its maximally open position is not impeded.

It is advantageous for the locking stop to be arranged on the cover frame and, in the operating position, to press against an abutment fixed to the vehicle body. The locking stop can be actuated by a sliding link arranged on the cover frame and executes a sliding movement on the cover frame and is pressed by the force of a spring into the non-operating position. When the cover is in its closed position, this sliding link is pressed by the cover or a component of the kinematic system against the spring force into the non-operating position. The sliding link is directly mechanically coupled with the locking stop so that sliding movement of the sliding link is directly transferred into movement of the locking stop to change it between operating and non-operating positions.

The above features, and other features and advantages of the present invention as readily apparent from the following detailed descriptions thereof when taken in connection with the accompanying drawings.

BRIEF DESCRIPTION OF THE DRAWINGS

FIG. 7 illustrates an enlarged depiction of the portion of the cover frame connected to the kinematic system in which this cover frame portion includes a sliding link associated with a stop device through which the cover frame is stopped in a raised intermediate position during the loading of the trunk while the kinematic system is in its extended position in which the cover is in its opened position raised above the storage compartment;

FIG. 9 illustrates an enlarged depiction of the stop device in its operating position in which a locking stop of the stop device is supported on an abutment fixed to the vehicle body; and FIG. 10 illustrates an enlarged depiction of the stop device in its non-operating position.

DETAILED DESCRIPTION OF THE PREFERRED EMBODIMENT(S)

In the figures, elements that are the same and elements having the same function are labeled with the same reference numbers.

Figure 1:
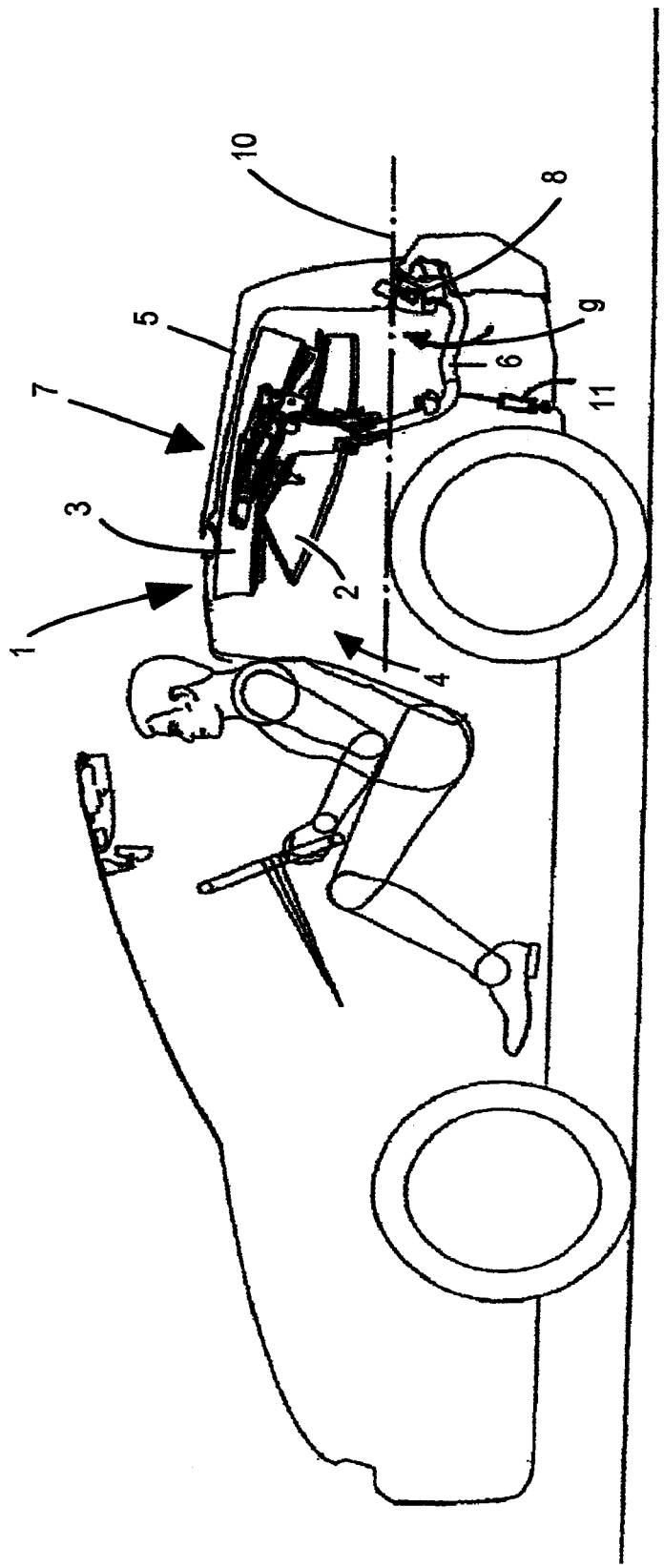
FIG. 1 illustrates a side view of a roof in which the roof is in its storage position with the roof parts of the roof lowered and stowed in a rear storage compartment of a vehicle and a cover is in its closed position covering the storage compartment.

Referring now to FIGS. 1, 2, 3, and 4, a convertible vehicle having a foldable roof 1 in accordance with an embodiment of the present invention is shown. Roof 1 is in the form of a two-part hardtop roof having a front roof part 2 and a rear roof part 3. Roof 1 is movable between a closed position in which roof parts 2, 3 cover the vehicle interior and a storage position in which rear roof part 3 stacks on top of front roof part 2 and the roof part stack 2, 3 is lowered and stowed in a rear storage compartment 4 of the vehicle. Storage compartment 4 is a component of the trunk of the vehicle. FIG. 1 illustrates roof 1 in its storage position.

Figure 2:
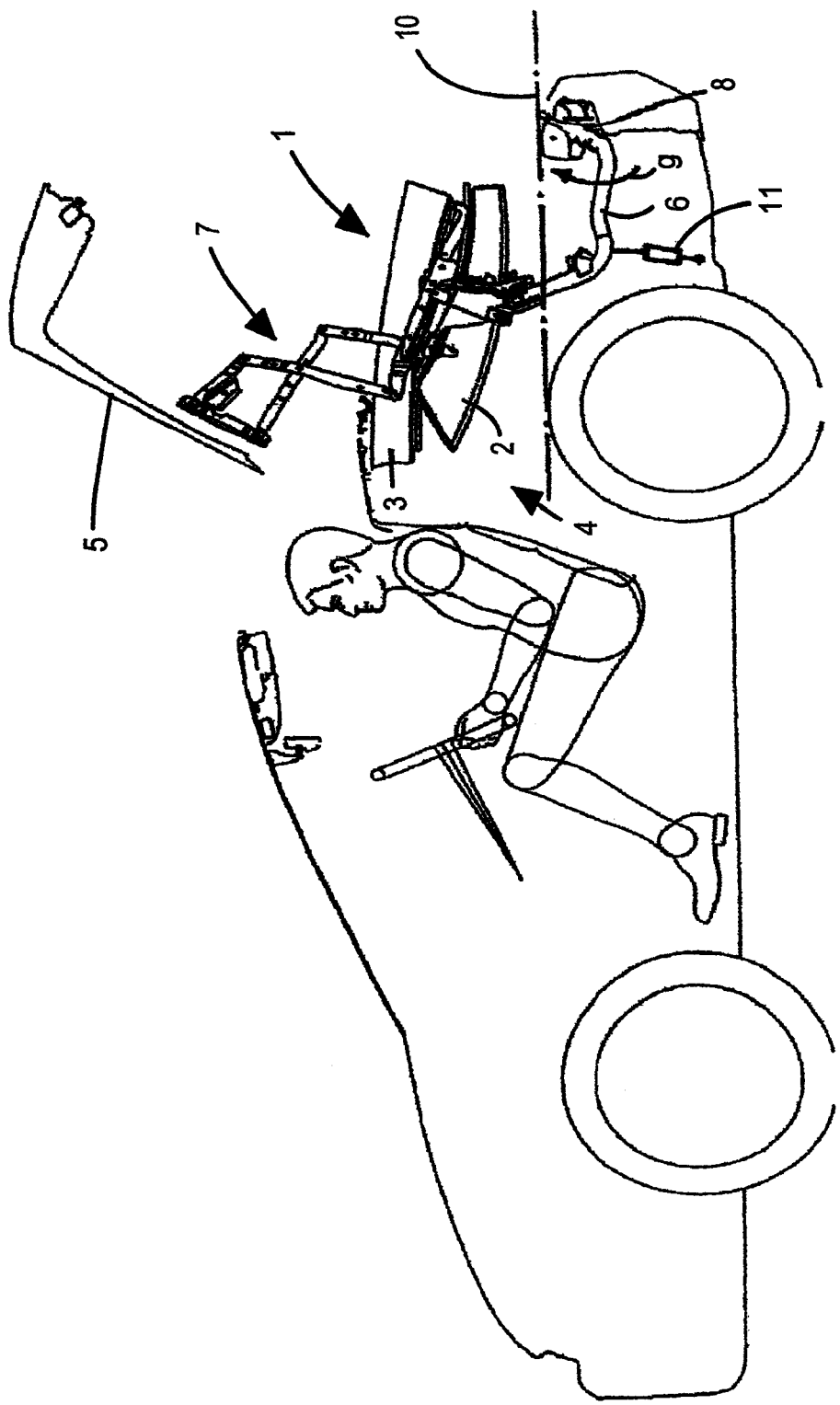
FIG. 2 illustrates the cover in its opened position raised above the storage compartment.
Figure 3:
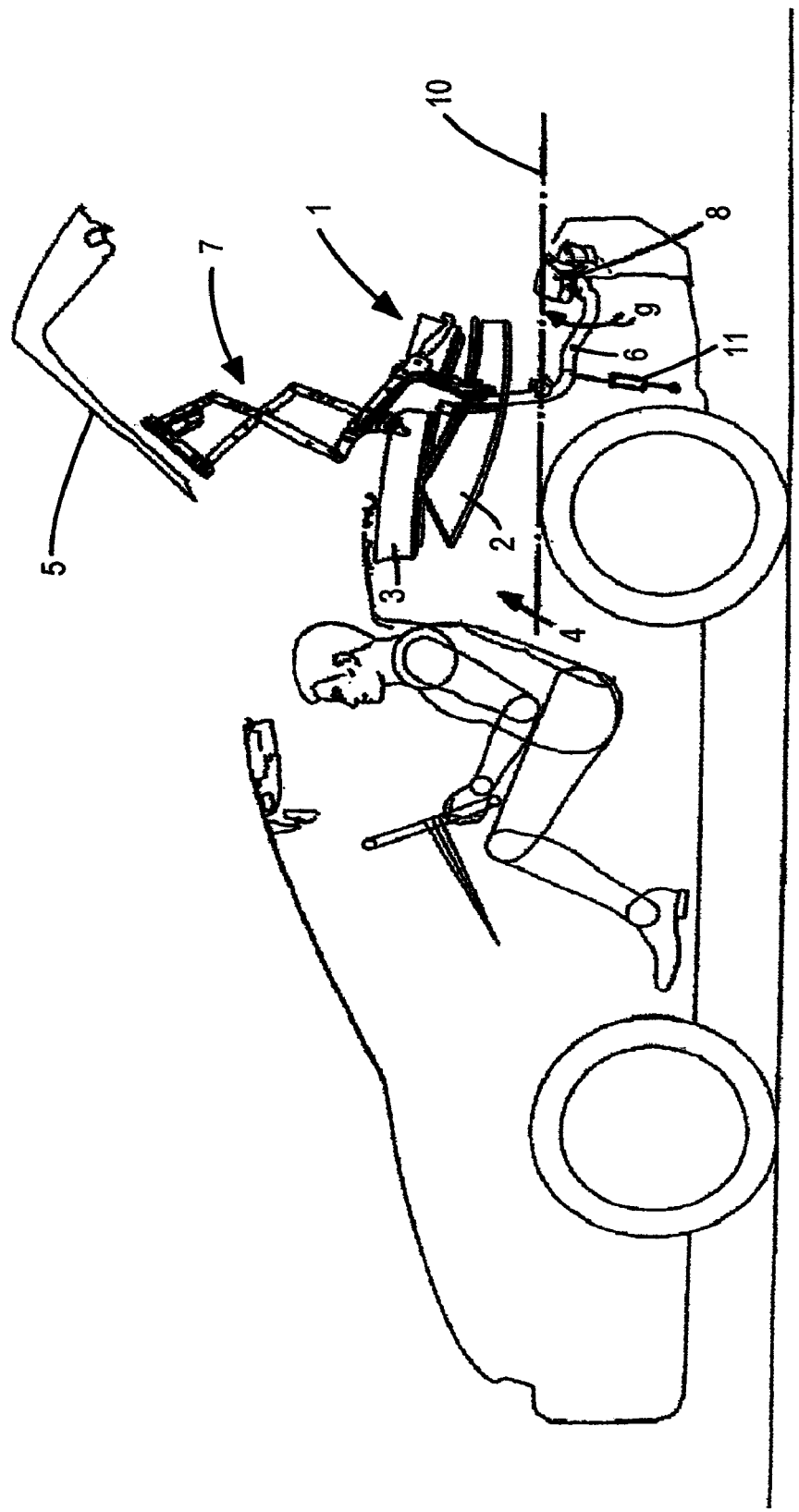
FIG. 3 illustrates the cover in its opened position raised above the storage compartment with the cover frame which carries the cover being in a raised position.
Figure 4:
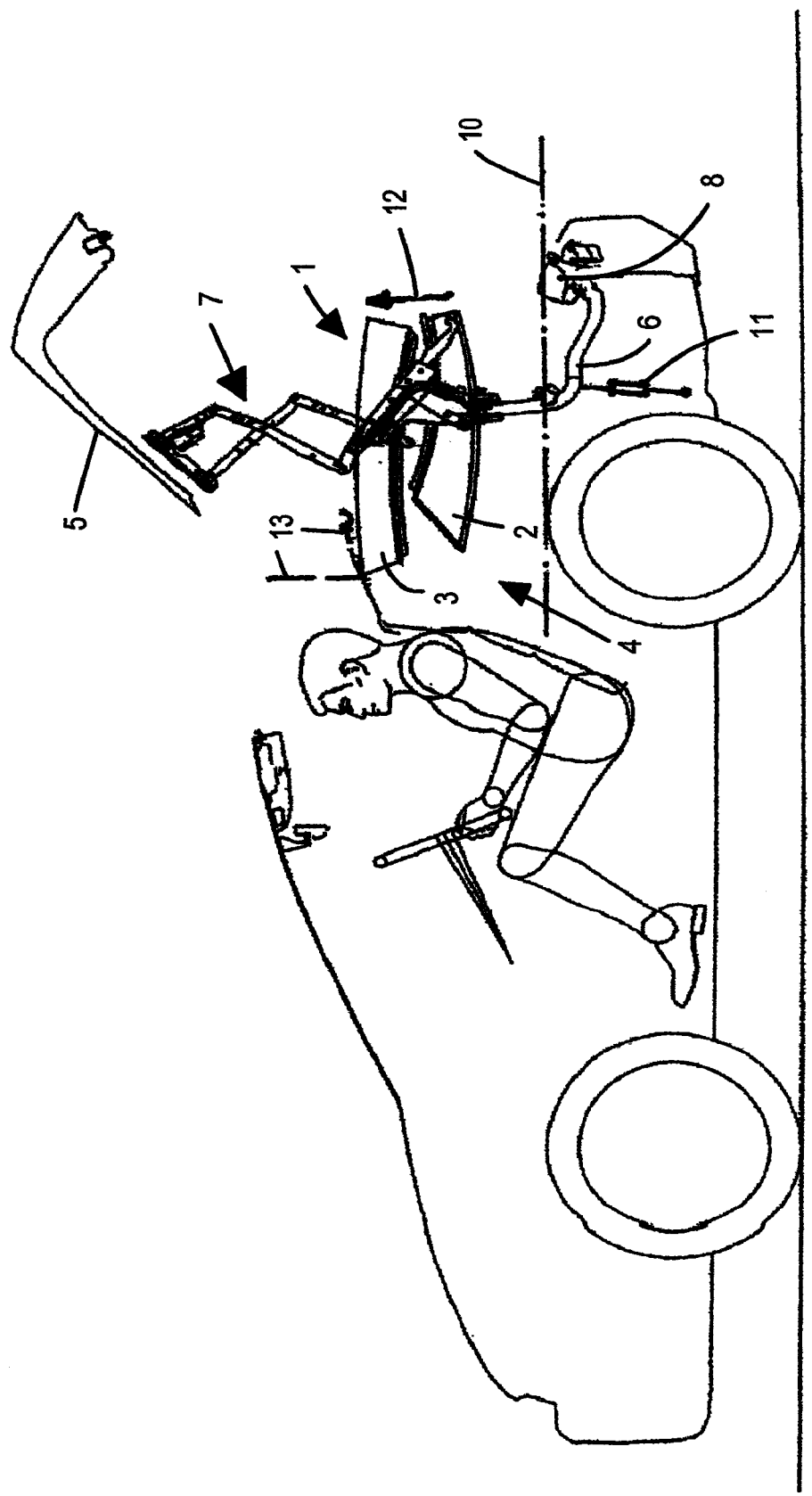
FIG. 4 illustrates the cover in its opened position raised above the storage compartment with the cover frame in its raised position and further illustrates the roof parts stowed in the storage compartment in a raised loading assistance position.

A rear cover 5 is movable between a closed position in which cover 5 covers trunk 4 and an opened position in which cover 5 is raised above and exposes trunk 4. FIG. 1 illustrates cover 5 in its closed position. FIGS. 2, 3, and 4 illustrate cover 5 in its opened position.

A multiple-bar kinematic system 7 movably connects cover 5 to a rear cover frame 6. Kinematic system 7 holds cover 5 on cover frame 6 in a relatively mobile manner. In this embodiment, kinematic system 7 is a seven-bar kinematic system and cover frame 6 is a tubular frame. Cover frame 6 is coupled through a rear pivot axis 8 to be pivotable on the vehicle body such that cover frame 6 can be swung up in the direction of arrow 9.

Kinematic system 7 is movable between an extended position and a retracted (folded) position. When kinematic system 7 is in its extended position, cover 5 is in its opened position as shown in FIGS. 2, 3, and 4. When kinematic system 7 is in its retracted position, cover 5 is in its closed position as shown in FIG. 1. Kinematic system 7 folds in to close cover 5 over trunk 4. Cover 5 and cover frame 6 are brought close together when cover 5 is closed.

An actuator 11 supported on the vehicle body is connected to cover frame 6. Actuator 11 actuates to swing up cover frame 6 in the direction of arrow 9. The upswing movement in the direction of arrow 9 is executed by cover frame 6 (including cover 5 arranged on cover frame 6 via kinematic system 7) first when roof 1 is moved between its closed and storage positions and second to open and load trunk 4.

Horizontal reference line 10 (shown in FIGS. 1, 2, 3, and 4) represents the height of contact between the rear edge of cover 5 and the vehicle body when cover 5 is in its closed position. Reference line 10 is intended to illustrate the raising movement of cover frame 6 and roof 1 to achieve a loading assistance position.

FIG. 2 illustrates cover 5 in its opened position in which the rear edge of cover 5 is raised relative to trunk 4. This is achieved by actuating or extending kinematic system 7, through which cover 5 is coupled to cover frame 6. Both cover frame 6 and the stored stack of roof parts 2, 3 remain in lowered storage positions.

In FIG. 3, actuator 11 actuates to move cover frame 6 in the direction of arrow 9 until cover frame 6 is put in a raised intermediate position. The raised intermediate position of cover frame 6 shown in FIG. 3 (and FIG. 4) can be seen by comparison of reference line 10 with the lowered storage position of cover frame 6 shown in FIGS. 1 and 2. In FIG. 3, cover 5 is still raised relative to cover frame 6. However, the position of cover 5 is slightly changed (from its raised position as shown in FIG. 2) due to the swinging up of cover frame 6 with respect to the vehicle body. Stacked roof parts 2, 3 remain in their lowered storage position in trunk 4.

In FIG. 4, cover frame 6 and cover 5 are located in the same position as in FIG. 3. However, stacked roof parts 2, 3 has been raised into a raised loading assistance position within trunk 4 as indicated with the direction of arrow 12. This is achieved by actuating a roof kinematic system associated with roof 1. The roof kinematic system is connected to roof parts 2, 3 to move roof 1 between its closed and storage positions. When roof parts 2, 3 are in their raised loading assistance position, it is easier to load and unload trunk 4. The raised loading assistance position can be achieved without collision as those sections of cover frame 6 lying above roof 1 in its storage position are raised. The raised intermediate position of cover frame 6 makes it possible to achieve the loading assistance position of roof 1.

The raising of roof 1 into its raised loading assistance position can be made easier by setting up a rear panel shelf 13 lying above the stored roof part stack 2, 3 when roof 1 is completely lowered into the position indicated by dashed lines.

Figure 6:
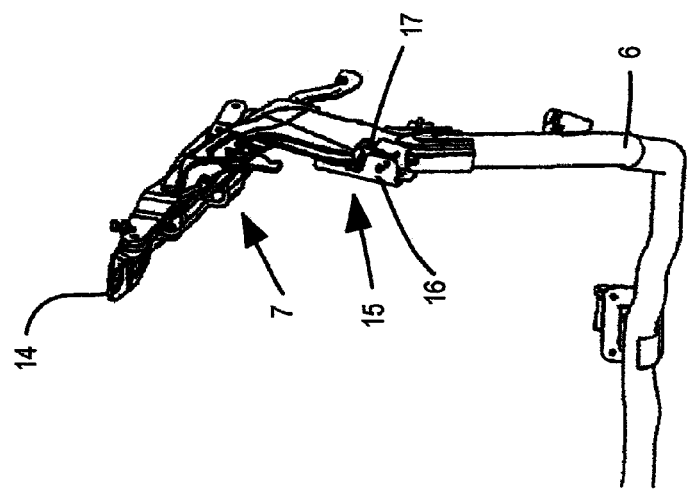
FIG. 6 illustrates a perspective view of the cover frame and the kinematic system between the cover and the cover frame with the kinematic system being in its retracted (folded) position in which the cover is in its closed position covering the storage compartment.
Figure 5:
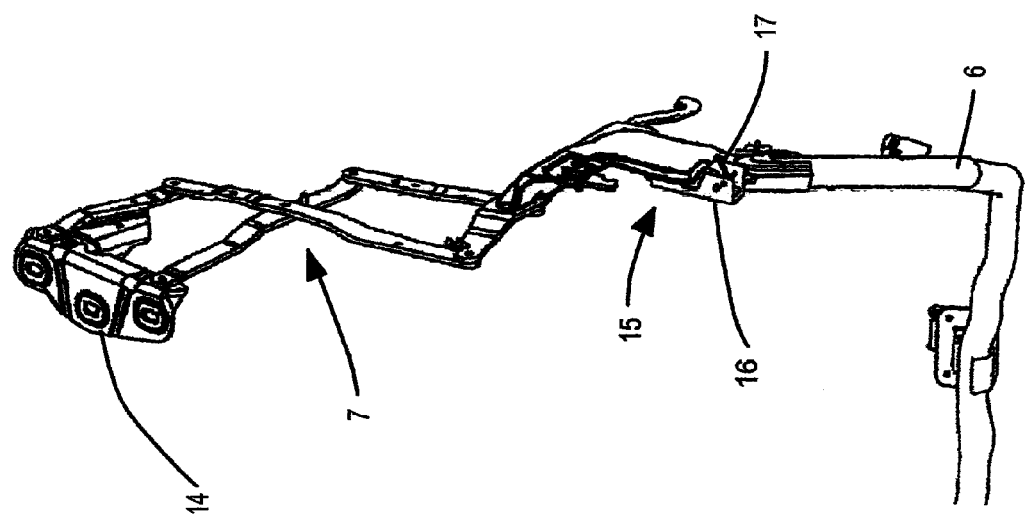
FIG. 5 illustrates a perspective view of the cover frame and the kinematic system between the cover and the cover frame with the kinematic system being in its extended position in which the cover is in its opened position raised above the storage compartment.

Referring now to FIGS. 5 and 6, perspective views of cover frame 6 and kinematic system 7 between cover 5 and cover frame 6 are respectively shown. FIG. 5 illustrates kinematic system 7 in its extended position in which cover 5 is in its opened position raised above trunk 4. FIG. 6 illustrates kinematic system 7 in its retracted (folded) position in which cover 5 is in its closed position covering trunk 4. Kinematic system 7 is in the form of a seven-bar kinematic system. Kinematic system 7 includes five individual links and a supporting plate 14 to which cover 5 is fastened.

A stop device 15 is on the portion of cover frame 6 connected to kinematic system 7. Stop device 15 functions to stabilize cover frame 6 in its raised intermediate position. Stop device 15 includes a sliding link 16 and a locking stop 17. Sliding link 16 and locking stop 17 are both held on cover frame 6 and can execute relative motion with respect to cover frame 6. Sliding link 16 is mounted on cover frame 6 such that sliding link 6 can slide on cover frame 6. Locking stop 17 is mounted on cover frame 6 so that locking stop 17 can pivot on cover frame 6. Sliding link 16 and locking stop 17 cooperate in that a sliding motion of sliding link 16 is converted into a swinging motion of locking stop 17.

Sliding link 16 is spring-loaded by a spring element into its operating position (i.e., the operating position of stop device 15) in which locking stop 17 assumes a swung outward position as shown in FIG. 5. This operating position is automatically assumed by locking stop 15 when kinematic system 7 is in its extended position as shown in FIG. 5. In this case, sliding link 16 can extend upward under the action of the spring element thereby moving locking stop 17 into the outward swung position shown in FIG. 5. Stop device 15 assumes the operating position when cover frame 6 reaches the intermediate position.

In FIG. 6, kinematic system 7 is in its retracted (folded) position. In the retracted (folded) position, a component of kinematic system 7 (shown in detail in FIG. 7) acts on the top edge of sliding link 16 and presses this top edge down against the force of the spring acting on sliding link 16. This corresponds to the non-operating position of stop device 15. In this non-operating position, locking stop 17 cooperating with sliding link 16 is moved into a swung-in position in which locking stop 17 does not project outward.

Figure 8:
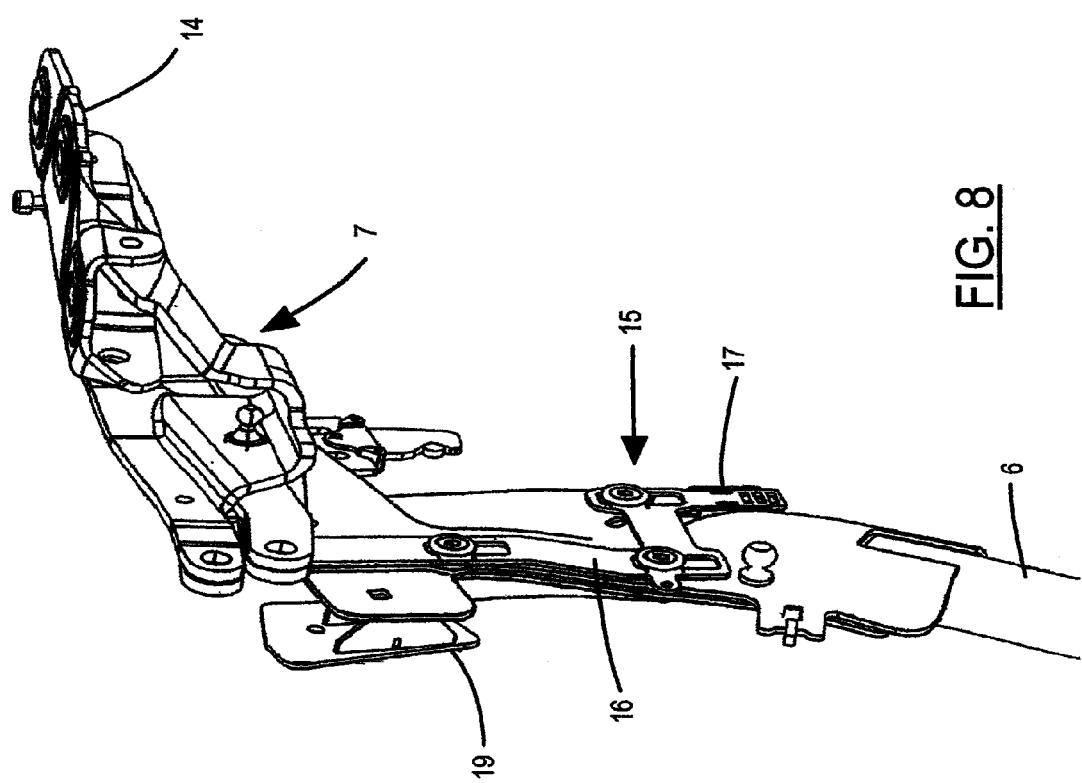
FIG. 8 illustrates an enlarged depiction of the portion of the cover frame with the kinematic system in its retracted (folded) position in which the cover is in its closed position covering the storage compartment.

Referring now to FIGS. 7 and 8, enlarged depictions of the portion of cover frame 6 connected to kinematic system 7 are respectively shown. FIG. 7 illustrates stop device 15 when cover frame 6 is stopped in its raised intermediate position during the loading of trunk 4 while kinematic system 7 is in its extended position in which cover 5 is in its opened position raised above trunk 4. FIG. 8 illustrates stop device 15 when cover frame 6 is in its lowered storage position while kinematic system 7 is in its retracted (folded) position in which cover 5 is in its closed position covering trunk 4. The enlarged depiction in FIG. 7 shows the form of sliding link 16 of stop device 15. Sliding link 16 has two parallel sections arranged offset to one another. The two parallel sections are connected with one another through a connecting piece. Sliding link 16 has elongated holes at three places, and is held to cover frame 6 to slide in the longitudinal direction in these elongated holes. A lower section on sliding link 16 cooperates with locking stop 17 such that longitudinal sliding of sliding link 16 produces a swinging movement of locking stop 17.

A link of kinematic system 7 includes an actuation pin 18. When kinematic system 7 is in its retracted (folded) position, actuation pin 18 applies force to top edge 16a of sliding link 16 to press sliding link downward against the force of the spring out of the operating position shown in FIG. 7 and into the non-operating position shown in FIG. 8. In this non-operating position, locking stop 17 is once again folded in.

An abutment 19 is held fixed to the vehicle body. When cover frame 6 is raised, locking stop 17 swings out in the operating position and is driven against abutment 19 (see FIG. 9). As soon as locking stop 17 comes to lie against abutment 19, cover frame is blocked from swinging up further. Actuator 11 acting on cover frame 6 presses cover frame 6 from below against abutment 19, stabilizing cover frame 6 and cover 5 held by cover frame 6.

FIGS. 9 and 10 respectively illustrate enlargements of stop device 15. In FIG. 9, stop device 15 is in the operating position in which locking stop 17 is pivoted outward about a pivot axis 17a through which locking stop 17 is mounted on cover frame 6. In the swung out operating position, locking stop 17 gets into a position in which it is stopped against a roller 21 of abutment 19, which is fixed to the vehicle body. This stop position corresponds to the raised intermediate position of the cover frame 6 (shown in FIGS. 3 and 4). Cover frame 6 cannot be raised farther than this intermediate position.

A locking pin 20 is on a component solidly connected with cover frame 6. Locking pin 20 limits the swing out travel of locking stop 17.

The lower section of sliding link 16 has several recesses 22 in it. Recesses 22 are arranged one behind the other and mate with corresponding teeth on locking stop 17 to convert translational sliding motion of sliding link 16 into a rotary swinging movement of locking stop 17.

LIST OF REFERENCE NUMBERS

1 Vehicle roof
2 Front roof part
3 Rear roof part
4 Cover storage compartment
5 Rear cover
6 Rear cover frame
7 Multiple-bar kinematic system
8 Pivot axis
9 Direction of arrow
10 Reference line
11 Actuator
12 Direction of arrow
13 Rear parcel shelf
14 Supporting plate
15 Stop device
16 Sliding link
16a Top edge
17 Locking stop
17a Pivot axis
18 Actuation pin
19 Abutment
20 Locking pin
21 Roller
22 Recess While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof assembly for a vehicle, the roof assembly comprising:

a roof having a plurality of roof parts adjustable between a closed position in which the roof parts cover an interior of a vehicle and a storage position in which the roof parts stack on top of one another and the roof part stack is lowered and stowed in a trunk of the vehicle;

a rear cover frame adjustably attached to the body of the vehicle to move between a maximum raised position and a lowered storage position;

a kinematic system connected between a rear cover and the rear cover frame, the kinematic system movable between an extended position in which the rear cover is in an opened position raised above the trunk and the rear cover frame is in a raised position, and a retracted position in which the rear cover is in a closed position covering the trunk and the rear cover frame is in the lowered storage position; and a stop device associated with the rear cover frame, the stop device limits the raising motion of the rear cover frame in an intermediate raised position between the lowered storage position and the maximum raised position, wherein the stop device includes a locking stop movable between an operating position corresponding to limitation of the raising motion of the rear cover frame and a non-operating position.

2. The roof assembly of claim 1 wherein:
the stop device is mechanically actuated through opening and closing movements of the rear cover.

3. The roof assembly of claim 1 wherein:
the locking stop is pivotably connected to the rear cover frame.

4. The roof assembly of claim 1 wherein:
the rear cover frame is pivotable upward about an axis of rotation next to the rear edge of the vehicle.

5. The roof assembly of claim 1 wherein:
when the rear cover frame is in the raised intermediate position, the locking stop is supported against an abutment fixed to the vehicle body.

6. The roof assembly of claim 5 wherein:
the rear cover frame is raised by an actuator into the raised intermediate position and pressed against the abutment.

7. The roof assembly of claim 1 wherein:
the kinematic system is a multiple-bar kinematic system.

8. The roof assembly of claim 7 wherein:
the multiple-bar kinematic system is a seven-bar kinematic system.

9. The roof assembly of claim 1 wherein:
movement of the rear cover causes the locking stop to move between the operating and non-operating positions.

10. The roof assembly of claim 9 wherein:
the locking stop is spring-loaded into the operating position and is pressed by the rear cover when the rear cover is in the closed position against the spring force into the non-operating position.

11. The roof assembly of claim 9 wherein:
the locking stop is moved between the operating and non-operating positions by a sliding link, wherein the sliding link in the non-operating position of the locking stop is acted on by the kinematic system.

12. The roof assembly of claim 9 wherein:
the locking stop is moved between the operating and non-operating positions by a sliding link, wherein the sliding link in the non-operating position of the locking stop is acted on by the rear cover.

13. The roof assembly of claim 12 wherein:
the sliding link is slidingly held on the rear cover frame.

* * * * *